Dec. 8, 1970    J. H. COVER, JR., ET AL    3,546,706
LIGHTWEIGHT REFLECTING STRUCTURES UTILIZING
ELECTROSTATIC INFLATION
Filed Oct. 31, 1966    4 Sheets-Sheet 4

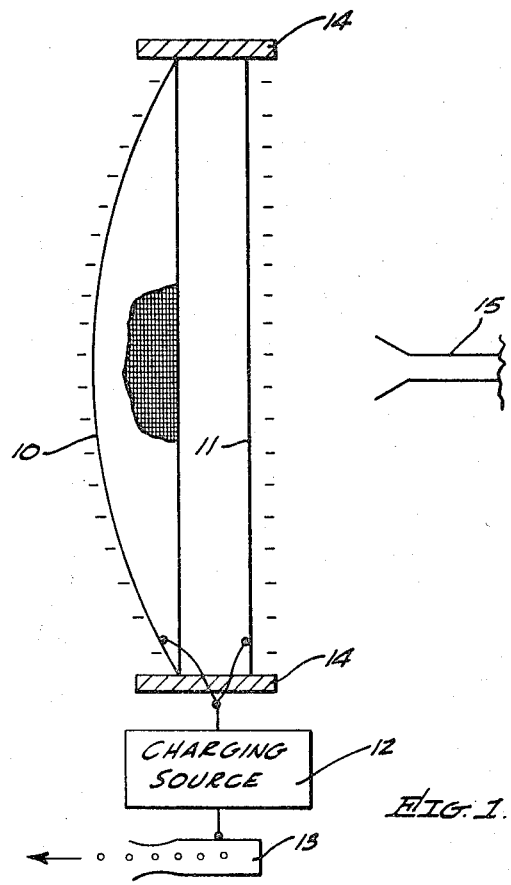
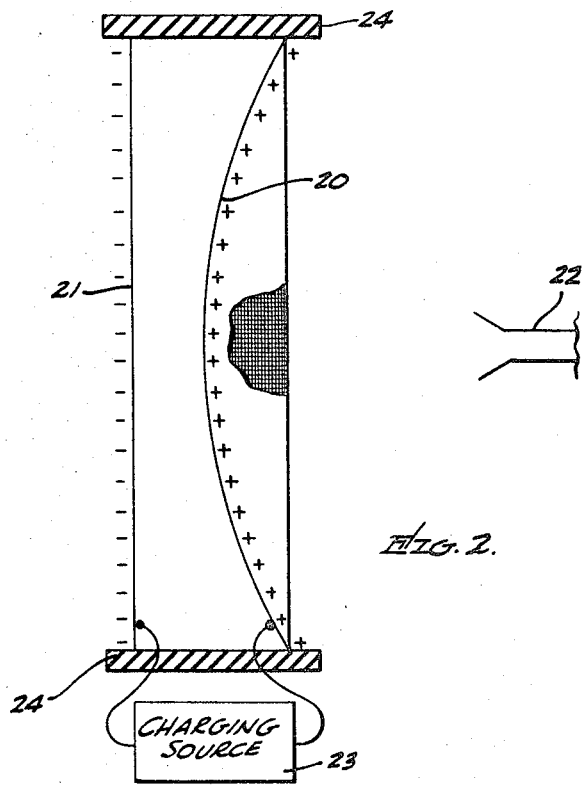

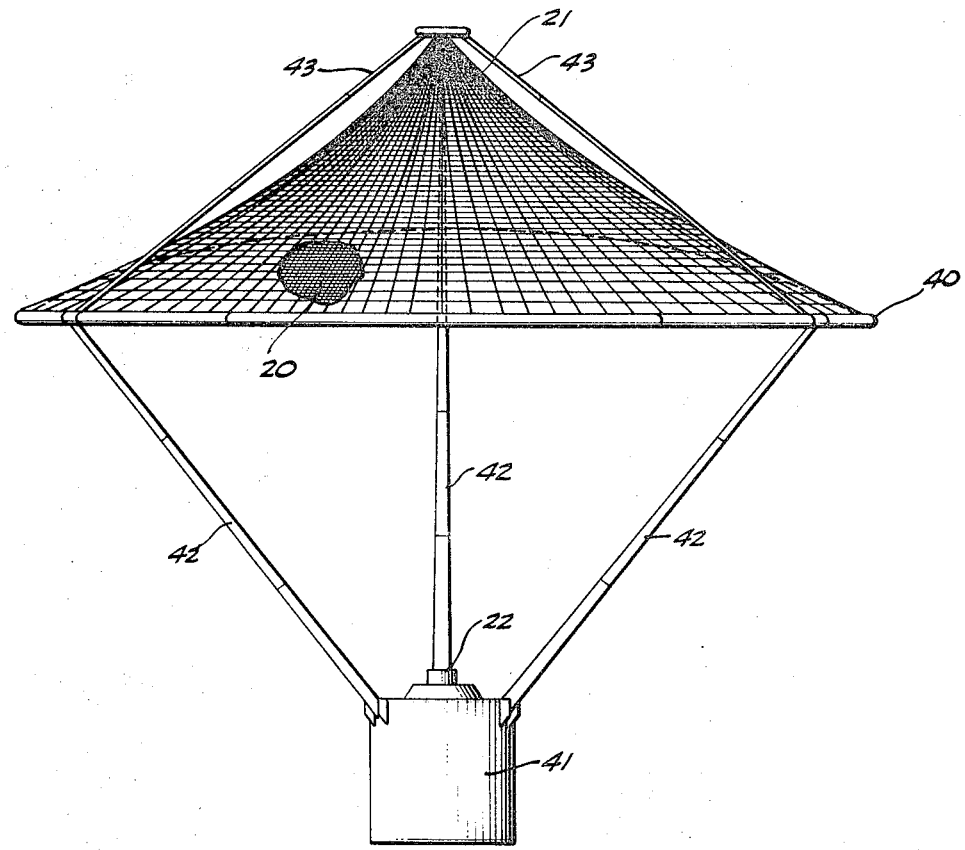
FIG. 4.
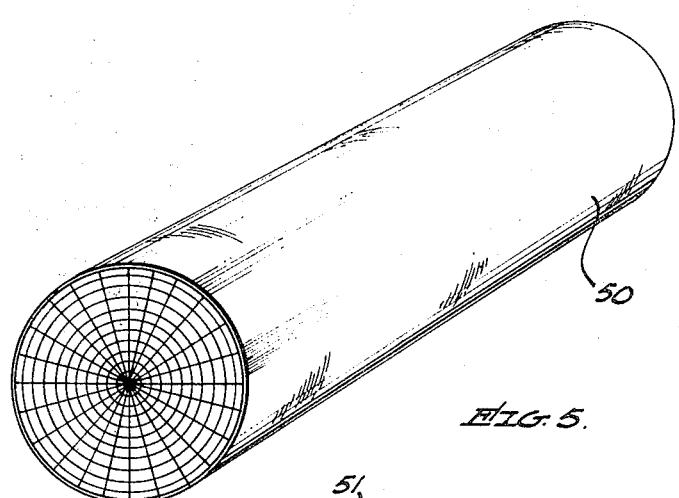
FIG. 5.
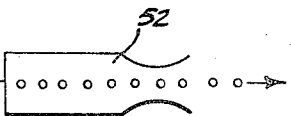

3,546,706
LIGHTWEIGHT REFLECTING STRUCTURES
UTILIZING ELECTROSTATIC INFLATION
John H. Cover, Jr., Woodland Hills, Wolfgang Knauer, Malibu, and Hans A. Maurer, Tarzana, Calif., assignors to Hughes Aircraft Company, Culver City, Calif., a corporation of Delaware
Filed Oct. 31, 1966, Ser. No. 590,593
Int. Cl. H01q 15/20
U.S. Cl. 343—840
12 Claims

ABSTRACT OF THE DISCLOSURE

This invention concerns a technique for deploying reflecting structures by means of electrostatic forces. The electrostatic inflation technique is especially suited to large-scale parabolic reflectors for spacecraft or satellite antennas. A preferred embodiment utilizes a preformed mesh of thin, lightweight conductors, such as aluminum-coated quartz fibers, supported at its periphery, for example, by an articulated ring. The preformed contour of the mesh is maintained by electrostatic forces of attraction or repulsion which, in turn, are produced by means of a similar mesh or contouring grid disposed in close proximity to the reflecting mesh and electrostatically charged with respect thereto.

---

This invention relates to reflectors for electromagnetic wave energy and more specifically to lightweight collapsible reflecting structures particularly suited for space applications.

Due to the rapid advances in space exploration and utilization in recent years, the gates of many new areas of technology have been opened. Of particular importance to investigators in these areas is the utilization of electromagnetic wave energy for communications, tracking, monitoring and other purposes. The vast distances over which space systems must operate frequently dictate the use of antennas which are highly directional. This generally requires large reflecting structures of close dimensional tolerances by which the electromagnetic radiation can be focused.

In addition to the use of electromagnetic reflecting structures in directional antenna applications it is frequently desirable to utilize reflectors which are not structurally integrated with transmitting or receiving apparatus. For example, reflecting structures such as metalized balloons, deployed in space have been utilized as passive reflectors for electromagnetic waves for communications purposes. In addition, passive reflecting structures can be utilized as "decoys" to confuse radar apparatus or discourage detection of satellites or space vehicles.

As an emerging art, the design of electromagnetic wave reflectors for space applications has taken many tacks. For relatively small structures it is possible to utilize designs borrowed from terrestrial applications and adapted for the environs of space. For example, if a parabolic reflector having a diameter of a few feet is all that is required, a rigid pre-assembled structure can be deployed in space rather easily. However, where relatively large reflectors are required, size and weight limitations prohibit the utilization of rigid pre-assembled structures.

In addition to the size and weight limitations which are encountered in the design of reflectors for space applications, many other problems are presented. These problems are discussed by L. K. DeSize and J. F. Ramsay in chapter 2 of the treatise "Microwave Scanning Antennas," vol 1, Academic Press, New York, 1964 at pp. 197–204. The authors conclude that the problems encountered by reflectors in space dictate the use of inflatable or erectable techniques.

Accordingly, it is a general object of the present invention to provide an improved technique of deploying electromagnetic wave reflecting structures particularly suited for space applications.

As indicated hereinabove and as discussed in the cited treatise, many approaches have been proposed for erecting or inflating large-scale reflecting antennas in space. As used herein, the term "large" as applied to reflecting structures refers to structures having dimensions ranging from several feet to several hundred feet or more. One prior art approach contemplates the use of a number of ribs which are unfolded much like an umbrella and to which a reflecting membrane is attached. Another proposed device, sometimes referred to as a "swirlabola," also utilizes rib-like members which when furled are wound about a central hub and which when unfurled extend radially and support a metalized plastic or fabric reflecting surface. Both the umbrella and the swirlabola designs contemplate the use of prestressed or preformed beams or ribs. Such designs, when employed in large reflector applications, are subject to undesirable thermal deformation and concomitant changes in contour.

A "petaline" or "leaf-type" reflector has also been proposed. This reflector utilizes preformed pie-shaped segments of fairly rigid sheet metal or metalized plastic. When furled the pie-shaped segments are stacked. When deployed these segments rotate about a central hub somewhat in the manner of a fan and are latched into place to form a paraboloid reflector. Again, such a design in large-scale applications is unsuitable, mainly because of the weight limitations brought about by the requirement for the high-stiffness segments, but also because of inherent thermal distortions.

It has also been proposed to utilize erectable antennas having a hollow bladder-like framework which, when deployed, is inflated by gas or foam. The framework thereby assumes a substantially rigid configuration which is supportive of a reflecting membrane. The close dimensional tolerances which are required for most applications, however, are extremely difficult to maintain with such a structure. In addition, this design shares with the other above-mentioned prior art designs, the disadvantage of a somewhat high weight-to-size ratio for large diameters.

It is therefore another object of the present invention to provide an erectable electromagnetic reflecting structure characterized by its low weight-to-size ratio for a given tolerance.

In accordance with the principles of the present invention, these objects are accomplished in a preferred embodiment by utilizing a preformed mesh of lightweight electrically conductive members such as wires or conductively coated fibers. The mesh is supported at its periphery by an articulated ring-like structure. The preformed contour of the mesh is maintained by an electrostatic pressure which is provided by a similar conductive mesh or grid disposed in proximity to the reflecting mesh and electrically charged with respect thereto.

Balloon or cannister-like reflecting structures can also be adapted for "inflation" by electrostatic forces. In such an application a mesh structure of conductive elements is preformed in the desired shape and closed upon itself so as to describe a continuous surface. The mesh is then electrically charged. The repulsive electrostatic forces between separated regions of the mesh thereby maintain the contour of the reflector.

The above-mentioned and other features and objects of this invention will become more apparent by reference to the following description taken in conjunction with the accompanying drawings, in which:

FIG. 1 is a simplified cross-sectional view of one embodiment of the present invention;

FIG. 2 is a simplified cross-sectional view of another embodiment of the present invention;

FIG. 4 is a more detailed pictorial view of the embodiment shown in FIG. 2;

FIG. 5 is a simplified pictorial view of another embodiment of the present invention.

Figure 3:
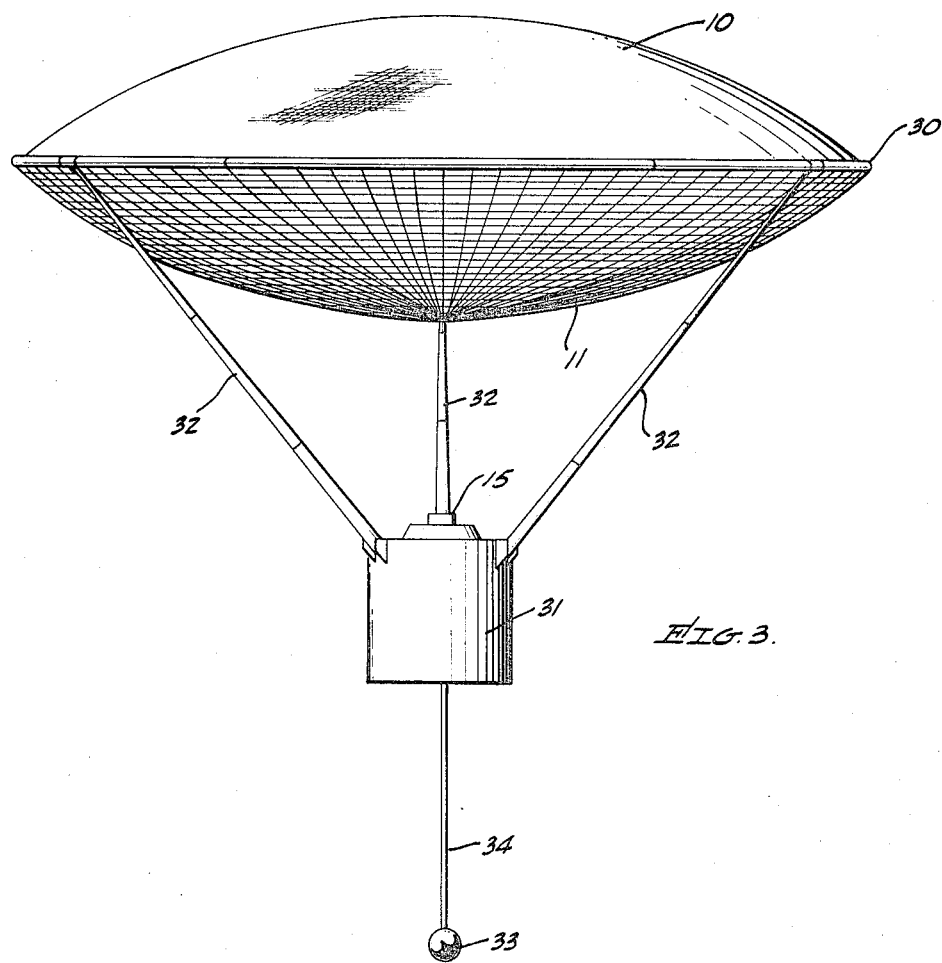
FIG. 3 is a more detailed pictorial view of the embodiment shown in FIG. 1.

Referring more specifically to the drawings, FIG. 1 is a simplified cross-sectional view of a reflecting structure of the present invention. In FIG. 1 a reflecting surface 10 and a contouring grid 11 are disposed so that they are substantially coextensive. Both reflecting surface 10 and contouring grid 11 are conductively connected to a charging source 12 which is capable of imparting an electric charge of like polarity thereto.

An ion expeller 13 is coupled to charging source 12 and serves to remove opposite charges from the vicinity of the system. In the embodiment of FIG. 1, the polarity of the charges on reflecting surface 10 and contouring grid 11 is designated negative. It is understood, however, that positive charging can also be employed, in which case ion expeller 13 can be replaced by an electron expeller.

In general, reflecting surface 10 and contouring grid 11 are connected around their peripheries by a rigid support member 14 which in the case of the embodiment of FIG. 1 can be of electrically conductive material. Reflecting surface 10 is fabricated of thin lightweight material which is either conductive or which has a layer of conductive material disposed or otherwise bonded thereto.

An RF feed means for illuminating reflecting mesh 10 is also shown. For the sake of clarity, RF feed means 15 is indicated simply as an open ended waveguide section. It is understood, however, that any suitable RF feeds may be employed including more sophisticated structures employing subreflectors.

It is well-known that conductive wire meshes have RF reflecting properties similar to the reflecting properties of solid conductive surfaces when the spacing between adjacent wires is a small fraction of a wavelength at the frequency of operation. It is thus possible to construct a reflecting surface therefrom. It has been found that thin quartz fibers coated with a very thin layer of aluminum are especially adapted for use in reflecting meshes. In addition to the very light weight of such a mesh it is highly resistant to kinks and fractures, and once formed into a surface of a given shape, tends to maintain that shape to a high degree of accuracy.

In the particular case of the embodiment of FIG. 1, reflecting surface 10 can comprise such a conductive mesh in which the separation between adjacent conductive members or fibers is a small fraction of a wavelength at the highest frequency of intended operation. The contouring grid 11 can comprise a similar mesh except that the spacing between conductive members is substantially greater than the lowest operating wavelength. In the alternative, contouring grid 11 can also comprise a mesh or surface of material which by ordinary standards may be considered a dielectric. That is, grid 11 may be of a highly resistive material such as Mylar which, nevertheless, is capable of being electrically charged over a relatively long time interval. In this manner contouring grid 11 is substantially transparent to wave energy at the operating frequencies, whereas reflecting mesh 10 is substantially totally reflective of such wave energy.

In the copending application of J. H. Cover, Jr. R. K. Jenkins and L. B. Keller, Ser. No. 590,571, filed Oct. 31, 1966, there is disclosed a method for fabricating a conductive mesh suitable for this application. Briefly, the fabrication technique comprises the steps of laying a grid of conductively coated quartz fiber over a mandrel preformed in the shape of the desired reflecting surface. The intersections of the fibers are then bonded and the mesh removed from the mandrel.

In a terrestrial environment the forces, or more accurately the force per unit area (i.e., pressure), needed to maintain the contour of the reflecting mesh must, in general, be sufficient to overcome gravitational forces as well as forces due to wind. In a space environment, however, the pressure required to maintain the contour of the reflecting mesh is much smaller due to the lack of significant gravitational and wind forces. Of course, other forces and effects may be encountered by an electrostatically contoured antenna in a space environment. To the extent that these environmental disturbing forces are believed to affect the operation of the various embodiments of the present invention, they will be discussed in greater detail hereinbelow.

In keeping with the principles of the present invention, the contouring pressure is provided by the mutual repulsion of reflecting mesh 10 and contouring grid 11 brought about by the like electrostatic charges on each. In this manner mesh 10 and grid 11 behave somewhat similar to the well-known gold leaf electroscope. The basic contouring techniques illustrated by the embodiment of FIG. 1 is referred to as a "monopole" or "monostatic" configuration. That is, in the monostatic design an electric potential of a single sign, either positive or negative, is used to produce an electrostatic repelling force between the two surfaces.

An alternative embodiment is illustrated in the simplified cross-sectional view of FIG. 2. In FIG. 2 the positions of the reflecting mesh 20 and contouring grid 21 are interchanged so that reflecting mesh 20 is interposed between the RF feed horn 22 and the contouring grid 21. In this embodiment a charging source 23 coupled to both surfaces is adapted to impart opposite charges on each. In order to maintain this opposite charge distribution, mesh 20 and grid 21 are spaced apart by means of an insulating member 24 which can advantageously be disposed around the periphery of the surface.

As in the case of the embodiment of FIG. 1, reflecting mesh 20 and contouring grid 21 can comprise preformed mesh structures of conductively coated fibers or thin wires. It is apparent, however, that the spacing of adjacent members or fibers of grid 21 need not be as large as the spacing required in grid 11 of FIG. 1. This is due to the fact that in the embodiment of FIG. 2 grid 21 need not be transparent to wave energy from feed horn 22.

In contrast to the monostatic configuration of FIG. 1, the pressure used for contouring reflective surface 20 derives from the forces of electrostatic attraction. In the embodiment of FIG. 2 charges or voltages of opposite sign are applied to the two surfaces. The design of FIG. 2 is thus termed a "bistatic" configuration. In this embodiment there is generally no need for an ion expeller or other means for removing charges. This is seen from the fact that the net charge of the mesh-grid combination is zero.

In the embodiments of FIGS. 1 and 2 the reflecting meshes 10 and 20 are generally of paraboloidal shape. Other shapes can be utilized, of course, depending upon design requirements. Similarly, the contouring grids 11 and 21 need not be flat but may be of paraboloidal or other shape, as will be indicated hereinbelow.

The voltage and current and hence, the power, requirements of the charging sources 12 and 23 depicted in the embodiments of FIGS. 1 and 2 depend upon several factors. First, the voltage requirement is determined by the particular configuration utilized (i.e., monostatic or bistatic), the size and geometry of the structure and the magnitude of the disturbing forces encountered in space—one of which being the solar photon pressure. Secondly, the current requirement is primarily determined by the above-mentioned voltage, the size of the structure and the environmental plasma density. The product of the charging voltage and current, in turn, determines the power losses.

Calculations based upon available data have been carried out for reflectors having diameters of thirty feet and deployed in each orbit at the so-called "synchronous" altitude of approximately 22,000 miles. These calculations indicate that charging source voltage requirements can vary from several thousand volts to several tens of thousand volts with corresponding power requirements ranging from less than one watt to several thousand watts.

A pictorial view, partially broken away, of an embodiment of the present invention is shown in FIG. 3. The embodiment of FIG. 3 is similar to the basic embodiment shown in FIG. 1 and for this reason like reference numerals have been carried over to designate like structural elements. A reflector support structure comprising a torus or tubular ring 30 is attached to a satellite or spacecraft body 31 by means of a tripod structure consisting of tubular support members 32. In general, ring 30 and support members 32 are composed of a plurality of segments which are suitably hinged and slidably engaged so that they can be folded or telescoped into a compact package prior to deployment. The mechanical details of an articulated ring suitable for this purpose are disclosed in the copending application of J. H. Cover, Jr. A. F. Fraser and B. R. Gaspari, Ser. No. 590,561, filed Oct. 31, 1966.

The reflecting mesh 10 is preformed into the desired shape as indicated hereinabove. It is then attached around its periphery to ring 30, as is contouring grid 11. In this embodiment a contouring grid having a surface of generally paraboloidal shape is indicated. It is understood, however, that since contouring grid 11 is substantially transparent to the RF wave energy, the dimensional tolerances are not as critical as those of reflecting mesh 10.

The feed means 15 is attached to the satellite or spacecraft body 31. A limited scan capability can be achieved if feed means 15 is adapted for selective displacement with respect to body 31, for example, by means of a waveguide rotational joint or other mechanical means well-known in the art.

In operation, an electric charging source located, for example, in the satellite or spacecraft body 31 supplies a charging current for imparting a negative or positive charge to reflecting mesh 10 and contouring grid 11. Conductive means for carrying this charging current between the source and the mesh and grid can be provided by means of support members 32. The electrostatic pressure arising from the mutual repulsion of the like charges on mesh 10 and grid 11 causes the mesh to assume its preformed contour.

Depending upon the polarity of the charge imparted to mesh 10 and grid 11, opposite charges may be removed from the system by means of ion expellers as indicated schematically in FIG. 1.

Ion expellers, accelerators or engines which can be adapted for this use are described by G. R. Brewer in an article entitled "Physical Electronic Phenomena in Ion Propulsion Engines" appearing in the IEEE Spectrum, vol. 2, No. 8, August 1965 at pp. 65–79 and references cited therein. In addition to providing the ejection of the necessary ions at the desired potential, the ion expeller also can be used for other spacecraft or satellite functions. Specifically, the ion expeller can be operated as a propulsion unit or engine which is capable of performing relatively minor spacecraft orbital or attitude changes. For this purpose the ion beam can be electrically deflected to provide the controlled thrust necessary for spacecraft alignment.

It is understood, of course, that at least two ion expulsion units should be employed to avoid a net acceleration for non-thrusting operation and a greater degree of freedom for thrusting operation. In the ion expeller described in the above-cited article the thrust producing mode of operation is achieved by the injection of electrons into the emerging positive ion beam to provide charge neutralization. By removing power to the electron injecting means the ion engine converts to a simple positive ion accelerator capable of inducing the desired electrostatic mesh-grid potential.

An alternative method for removing opposite charges from the mesh-grid combination of the monopole configuration of FIG. 3 utilizes a remote auxiliary charge storage surface indicated by spherical member 33. By this method the charges can be removed from the vicinity of the reflecting and contouring surfaces and imparted to the auxiliary storage surface 33 by means of conductive member 34.

In any event, opposite charges need not be removed from the bistatic configuration shown in the partially broken away pictorial view of FIG. 4. Due to structural similarities, like reference numerals have been carried over from FIG. 2 to designate like elements. As in the previous embodiment, a tubular articulate supporting ring 40 is attached to the satellite or spacecraft body 41 by means of telescoping tripod supporting members 42. A secondary tripod structure also composed of telescoping tubular members 43 is disposed on the opposite side of ring 40 away from the spacecraft body 41. When deployed as shown, ring 40 and supporting members 42 and 43 are preferably locked or otherwise fixed in position.

A reflecting mesh 20 fabricated as described above and preformed into the desired contour is attached around its pheriphery to ring 40. The contouring grird 21 illustrated in the present embodiment as having a somewhat conical shape is likewise mechanically coupled about its periphery to ring 40 and supported at its apex by the secondary tripod structure. It is noted, however, that contouring grid 21 is electrically insulated from reflecting mesh 20 by suitable standoff or strain insulators.

As indicated in the schematic diagram of FIG. 2, a high-voltage charging source is connected between reflecting mesh 20 and contouring grid 21. The charging source, not shown, can be mounted in or upon the satellite or spacecraft body 41 and electrically coupled to mesh 20 and grid 21 by suitable conductive means. The charging source is adapted to impart opposite charges to reflecting mesh 20 and contouring grid 21. As noted hereinabove, it is the mutual electrostatic attraction of the oppositely charged mesh and grid which gives rise to the electrostatic contouring pressure for maintaining the preformed contour of mesh 20.

Both the monostatic configuration of FIGS. 1 and 3 and the bistatic configuration of FIGS. 2 and 4 have certain advantages over the other which may be of importance in particular applications. It is noted first that the monostatic configuration is characterized by its structural simplicity and resultant low weight. The bistatic design, on the other hand, has advantages which in some applications may outweigh its relatively greater structural complexity.

First, as mentioned above, the bistatic configuration requires no charge expulsion or auxiliary charge storage means. Secondly, in the bistatic configuration much larger electrostatic pressures can be obtained for a given mesh-grid spacing and charging source potential. Also, the charge losses to the plasma encountered in space is smaller because much of the electrostatic field is confined to a relatively small region between the mesh and grid. In addition to these advantages it is also seen that the electrostatic pressure distribution can be readily varied in the bistatic design by varying the position or geometry of the contouring grid.

In FIG. 5 there is shown a pictorial view, partially in schematic, of another embodiment of the present invention. The embodiment of FIG. 5 is maintained for use as a decoy or marker reflector for deployment in space. This embodiment comprises a lightweight reflecting mesh structure 50 preformed into a closed cylinder. A high-voltage charging source 51 is electrically coupled between the mesh structure 50 and an ion or electron expeller 52. As before, charging source 51 serves to maintain an excess of negative or positive charges on structure 50. The mutual electrostatic repulsion of separated charged regions of the mesh serve to maintain the mesh in its preformed shape.

It is apparent that other reflector geometrics can be utilized instead of the cylindrical structure shown in FIG. 5. Corner reflector and spherical reflector geometries may be desirable in some applications. It is also to be noted that in many applications wherein decoy reflectors are intended for operation over a brief time interval, the charging source 51 and ion or electron expeller 52 can be eliminated. That is, a plurality of decoy reflectors can be electrostatically charged by a space craft and deployed with no further charge maintenance means.

Figure 6:
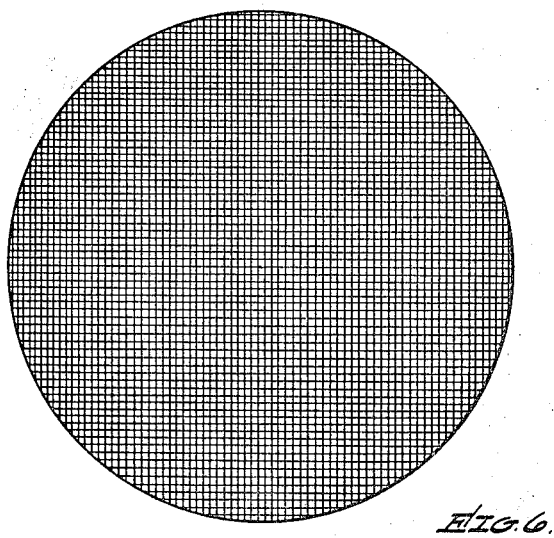
FIGS. 6 and 7 are plan views of alternative mesh wrap patterns useful in practicing the present invention.

In the embodiments of FIGS. 3 and 4 the reflecting meshes have been shown as utilizing a substantially rectangular wrap pattern; that is, the individual fibers which make up the reflecting mesh when viewed from the direction of the feed present a substantially square or rectangular pattern. This pattern is shown in the plan view of FIG. 6.

Figure 7:
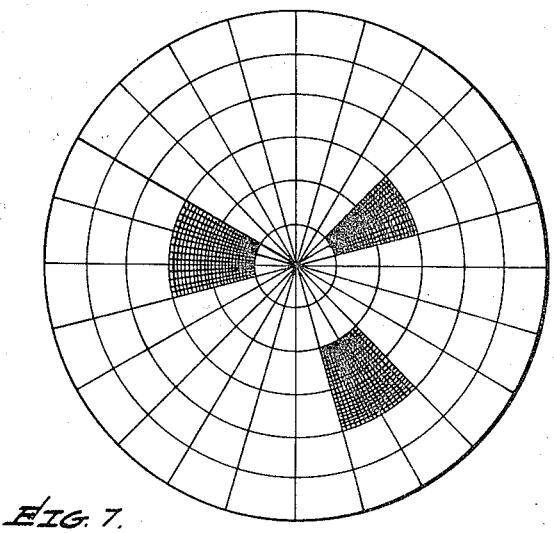

By the same token, the contouring grids have been illustrated as utilizing a so-called "polar-hoop" wrap pattern as shown in the plan view of FIG. 7. This polar-hoop wrap pattern, when viewed from the direction of the feed, appears as a plurality of concentric hoops which intersect radial fibers. For the sake of clarity, only a few of the individual fibers are indicated in FIG. 7. It is obvious, of course, that the two wrap patterns shown in FIGS. 6 and 7 can be interchanged with respect to the mesh and grid. It is also obvious that many other wrap patterns can be utilized depending upon design preference. With the rectangular and polar-hoop wrap patterns, as well as the other possible alternative wrap patterns, the spacing between adjacent fibers is largely a matter of design choice and depends primarily upon the frenquency range of intended operation.

Table 1 presents the approximate spacing between adjacent conductive members or fibers in the reflecting mesh for a reflectivity of 95 percent or better. The spacing, in general, corresponds to 1/20 wavelength.

| Band | Frequency, gHz. | Wavelength, inches | Fibers per inch |
| --- | --- | --- | --- |
| VHF | 300 | 39.4 | 0.5 |
| U | 1,200 | 9.8 | 2 |
| S | 3,300 | 3.5 | 5 |
| C | 5,000 | 2.3 | 7 |
|  | 7,000 | 1.7 | 9.6 |
| X | 8,000 | 1.5 | 11 |
|  | 9,000 | 1.3 | 12 |

TABLE 1

As mentioned hereinabove, the spacing between adjacent fibers of the contouring grid is, in general, substantially larger than the maximum wavelength of intended operation. Except for the lower-frequency UHF band a spacing of grid conductors on the order of one foot or more can be utilized.

In all cases it is understood that the above-described embodiments are merely illustrative of but a small number of the many possible specific embodiments which can represent applications of the principles of the present invention. Numerous and varied other arrangements, including other mesh and grid geometries, can be readily devised in accordance with these principles by those skilled in the art without departing from the spirit and scope of the invention.

What is claimed is:

1. A reflecting structure for electromagnetic wave energy comprising, a preformed surface of flexible electrically conductive material, and means for maintaining the preformed contour of said surface by pressure generated by an electrostatic field.

2. A reflecting structure for electromagnetic wave energy comprising, a preformed mesh of electrically conductive elements contoured by electrostatic forces.

3. A reflecting structure for electromagnetic wave energy comprising, in combination, a first mesh of flexible electrically conductive elements, a second mesh of flexible electrically conductive elements, said first and second meshes each being preformed to describe continuous surfaces, means for supporting said first and second meshes about their respective peripheries, means for electrically charging said first and second meshes, the preformed contour of at least one of said meshes being maintained by the electrostatic forces exerted thereon by virtue of said charges.

4. The reflecting structure according to claim 3 wherein said conductive elements comprise quartz fibers coated with aluminum.

5. A lightweight antenna for operation over a predetermined frequency range comprising, in combination, a reflecting mesh of flexible conductive elements, said reflecting mesh being preformed to describe a continuous surface, a contouring grid comprising a second mesh of electrically conductive elements, the spacing between adjacent conductive elements of said reflecting mesh being substantially less than the smallest wavelength of the wave energy within said frequency range, means for supporting said reflecting mesh and said contouring grid about their respective peripheries, the projection of said supported reflecting mesh upon supported contouring grid being substantially coextensive therewith, means for electrically charging said reflecting mesh and contouring grid, the preformed contour of said reflecting mesh being maintained by the electrostatic forces exerted thereon by virtue of said charges and feed means electromagnetically coupled to said reflecting mesh.

6. The antenna according to claim 5 wherein said reflecting mesh and said contouring grid are oppositely charged.

7. The antenna according to claim 5 wherein said charges upon said reflecting mesh and said contouring grid are of like polarity and wherein said charging means includes means for removing from the vicinity of said mesh and grid charges of opposite polarity.

8. The antenna according to claim 7 wherein said charge removal means includes an auxiliary charge storage surface.

9. The antenna according to claim 7 wherein said charge removal means includes at least one ion expeller.

10. The antenna according to claim 7 wherein said charge removal means includes at least one electron expeller.

11. A directional antenna for operation over a given band of frequencies comprising in combination:
   a first preformed mesh of conductive elements, said first mesh being substantially totally reflective of electromagnetic wave energy having frequency components within said band of frequencies;
   a second preformed mesh of conductive elements, said second mesh being substantially transparent to electromagnetic wave energy having frequency components within said band of frequencies;
   a supporting ring mechanically connected about the respective peripheries of said first and second meshes;
   an electrical charging means coupled to said first and second meshes, said charging means being capable of maintaining an electrical charge of like sign on said first and second meshes;
   antenna feed means electromagnetically coupled to said first mesh; and
   means for mechanically positioning said feed means with respect to said supporting ring.

12. A directional antenna for operation over a given band of frequencies comprising, in combination:
   a first preformed mesh of conductive elements, said first mesh being substantially totally reflective of electromagnetic wave energy having frequency components within said band of frequencies;
a second preformed mesh of conductive elements;
a supporting ring mechanically connected about the respective peripheries of said first and second meshes;
means for conductively insulating said first and second meshes;
an electrical charging means coupled to said first and second meshes, said charging means being capable of imparting an electrical charge of opposite sign to said first and second meshes;
antenna feed means electromagnetically coupled to said first mesh; and
means for mechaniaclly positioning said feed means with respect to said supporting ring.

References Cited

UNITED STATES PATENTS

| | | | |
|---|---|---|---|
| 3,184,742 | 5/1965 | Cutler | 343—915 |
| 3,221,333 | 11/1965 | Brown | 343—915 |
| 3,277,479 | 10/1966 | Struble | 343—915 |
| 3,420,469 | 1/1969 | Johnson et al. | 244—1(ES)UX |

ELI LUBERMAN, Primary Examiner

U.S. Cl. X.R.

343—915